United States Patent
Ikka

[19]

[11] Patent Number: 6,141,067

[45] Date of Patent: Oct. 31, 2000

[54] VISUAL DISPLAY DEVICE WITH CHANGEABLE DECORATOR PLATE

[75] Inventor: Masahiro Ikka, Sizuoka, Japan

[73] Assignee: NEC Corporation, Tokyo, Japan

[21] Appl. No.: 09/104,595

[22] Filed: Jun. 25, 1998

[30] Foreign Application Priority Data

Jun. 26, 1997 [JP] Japan ................................... 9-170389

[51] Int. Cl.[7] ...................... G02F 1/1335; G02F 1/1397; G02F 1/1333
[52] U.S. Cl. ................................ 349/65; 349/74; 349/77; 349/83; 349/58
[58] Field of Search ................................ 349/65, 58, 60, 349/74, 86, 83, 77, 81, 61

[56] References Cited

U.S. PATENT DOCUMENTS

| | | | |
|---|---|---|---|
| 4,371,870 | 2/1983 | Biferno | 349/65 |
| 4,514,920 | 5/1985 | Shafrir et al. | 349/58 |
| 4,516,834 | 5/1985 | Cascini | 349/81 |
| 5,262,928 | 11/1993 | Kashima et al. | 349/65 |
| 5,283,563 | 2/1994 | Allen et al. | 349/65 |
| 5,583,674 | 12/1996 | Mosley | 349/77 |
| 5,680,233 | 10/1997 | Faris et al. | 349/86 |
| 5,870,156 | 2/1999 | Hemmbrock | 349/64 |

*Primary Examiner*—William L. Sikes
*Assistant Examiner*—Toan Ton
*Attorney, Agent, or Firm*—Ostrolenk, Faber, Gerb & Soffen, LLP

[57] ABSTRACT

The visual display device of the present invention comprises a masking, a liquid crystal cell (LCD) and an illuminating light, in which display contents are not lost even when an decoration is provided in the portion being superposed on a display information, the decoration can be effected without blocking the illuminating light, and an decorating image are exchangeable so that a variety of contents of the decorating image can be cope with. As for its constitution, there are disposed, in the following order when viewed from the outside, a screen 1 (the masking plate), an LCD 2, an illuminating (light beam guiding) plate 3, an (decorating) image information plate 5 and a reflecting plate 6; the light beam guiding plate 3 is not of self-luminous element but guides a light beam from the side thereof to refract it; and the image information plate 5 is made exchangeable. From this, when the visual display unit is viewed from the outside, the image information plate 5 is positioned behind the LCD 2 and hence the image information never covers nor loses any information contents. Also, there is no blockage between the light beam guiding means and the LCD 2, and so the illumination is conducted over all of the display contents. Further, by using the exchangeable image information plate 5, the decoration with a variety of contents may be provided.

12 Claims, 5 Drawing Sheets

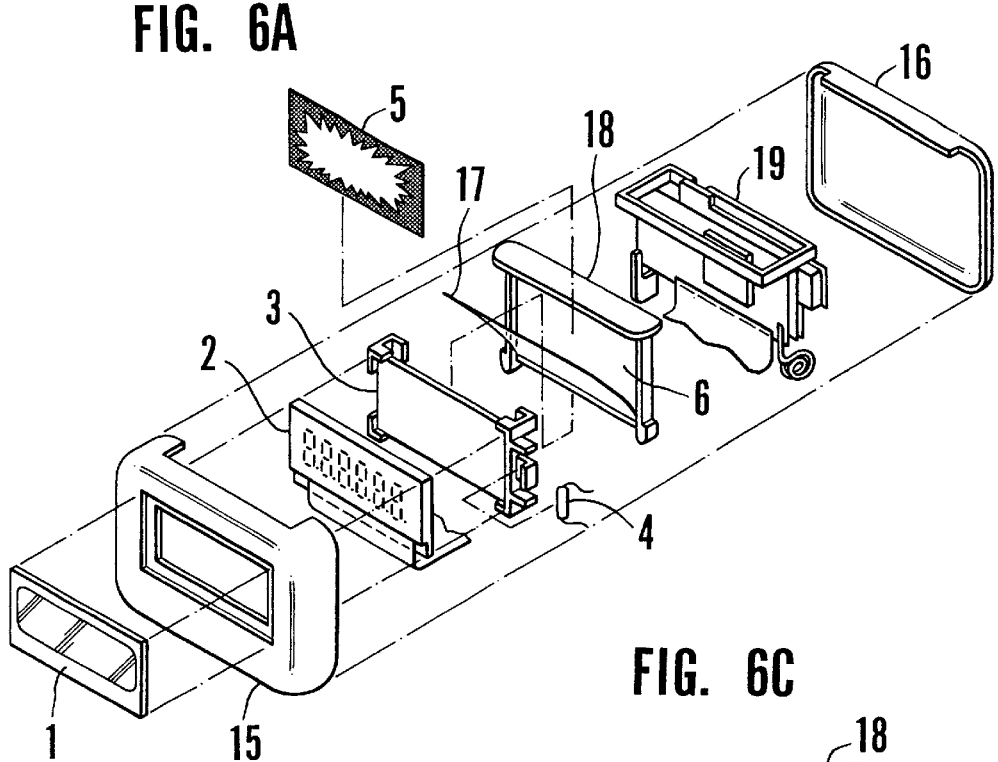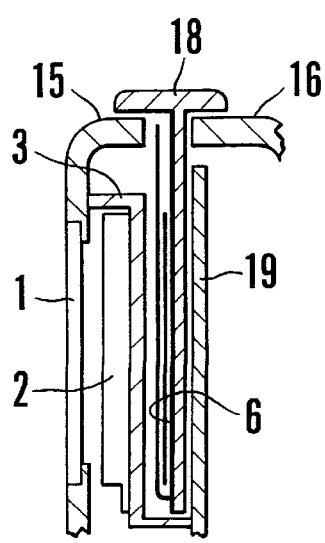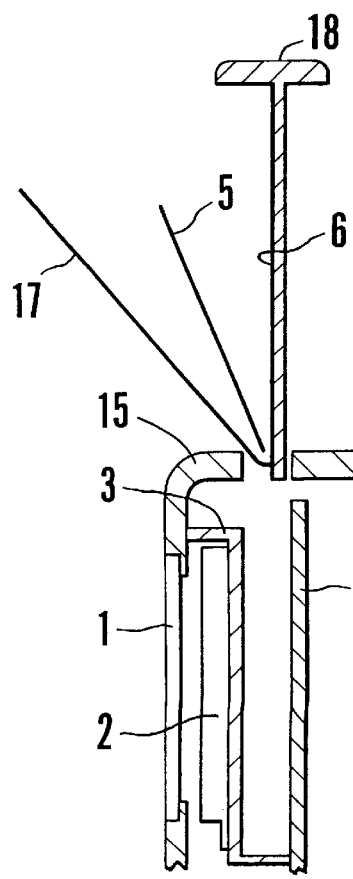

VISUAL DISPLAY DEVICE WITH CHANGEABLE DECORATOR PLATE

BACKGROUND OF THE INVENTION

1. Field of the Invention

The present invention relates to a displaying function for a portable device such as a pager, a handy game device, a watch, and so on.

2. Description of the Related Art

Referring to FIG. 1, FIG. 2A and FIG. 2B, the prior art is described. As illustrated in FIG. 1, a liquid crystal cell 22 comprises a display section 27a for blocking a light beam and indicating figures and graduations upon being driven electrically, a non-display section 27b for transmitting a light beam upon being driven electrically, and a background section 27c for always transmitting a light beam without being driven electrically. A masking plate 21 is formed of an optical motionless display pattern 31 such as a punched pattern in which a character, a fixed graduation, a frame and a design are colored appropriately. The other portion of masking plate 21 is a transparent window section 32. A light beam source 23 is a surface-shaped light emitting source.

Referring to FIG. 2A, in the display section, the effect of a light beam emitted from the outside is explained. When a light beam 24b passed through the window section 32 of the masking plate 21 reaches the display section 27a of the liquid crystal cell 22, the display section 27a blocks and absorbs the light to thereby be perceived as a dark portion when viewed from the outside (the left side in the figure).

When a light beam 25b passed through the window section 32 of the masking plate 21 reaches the non-display section 27b or the background section 27c of the liquid crystal cell 22, it can be transmitted through the liquid crystal cell 22 with very little loss of light so as to arrive at the surface light source 23 whereupon it is reflected and transmitted again through the liquid cell 22 and the masking plate 21 to reappear on the outside as a light beam 25c. Therefore, the light beam 25c reappearing outside is perceived as a surface color of the surface light source 23.

A light beam 26b which has reached the motionless display pattern 31 of the masking plate 21 cannot pass through the masking plate 21, but instead is reflected by the motionless display pattern 31. The reflected light beam 26c is then perceived as a color of the motionless display pattern 31.

Referring to FIG. 2B, in the display section, the effects of a light beam emitted from the inside is explained. When a light beam 28 generated from the light source 23 reaches the display section 27a of the liquid crystal cell 22, the display section 27a blocks and absorbs it to thereby be perceived as a black or dark portion when viewed from the outside (the left side in the figure).

When a light beam 29 produced by the light source 23 reaches the non-display section 27b or the background section 27c of the liquid crystal cell 22, it can be transmitted through the liquid crystal cell 22 with very little loss of light so as to pass through the window section 32 of the masking plate 21 and resultingly be emitted towards the outside. Accordingly, the emitted light beam 29 is perceived as the luminescent color of the light source 23.

When a light beam 30 generated from the light source 23 and passed through the background section 27c of the liquid crystal 22 reaches the motionless display pattern 31 of the masking plate 21, the light beam is blocked, absorbed or reflected by the motionless display pattern 31 so that it cannot be allowed to be emitted to the outside. Accordingly, this portion is perceived as a black or dark portion when seen from the outside.

As mentioned above, when the display section is viewed upon being lit with outside light, a brightness display is perceived where the color of the light source 23 is light and the light blocking portion caused by the display section 27a is dark, and a color display is perceived at the motionless display pattern 31.

On the other hand, when the display section is perceived using an inside light, a brightness display is recognized where the luminescence light caused by the surface light source 23 is light and the light blocking portion caused by the display section 27a and the fixed display section is dark.

The first problem with such a conventional visual display unit is that a colored punched pattern drawn on the motionless display section of the masking plate is rendered meaningless because only the brightness display is viewed as the display section.

The cause of this problem is that the punched pattern blocks light from passing therethrough and so cannot send frontward any color information of the light emitted from behind the pattern.

The second problem is such that the punched pattern on the masking plate is subjected to restrictions on the degree of freedom in its pattern layout because it must be designed in such a manner as to avoid covering the display of the liquid crystal cell.

This is because the punched pattern is adapted to block light and so shields the display of the liquid crystal cell if the latter is positioned behind the former.

Even if the masking plate is interposed between the liquid crystal cell and the light source, while the display of the liquid crystal cell can be seen where it is superposed on the masking plate, the punched pattern blocks the light emitted from the light source and eventually prevents the display of the liquid crystal cell from being brightly illuminated.

The third problem is that the punched pattern does not necessarily constitute an appropriate pattern for a particular display on the liquid crystal cell which is intended to be provided with a variety of visual contents.

The reason for this problem is that since the pattern of the masking plate intended to decorate the display of the liquid crystal cell is a motionless display pattern, it must rely on the display contents of the liquid crystal cell to be relatively unvarying or otherwise employ a plain and acceptable pattern of the masking plate that would not clash or interfere with the display contents of the liquid cell.

SUMMARY OF THE INVENTION

An object of the present invention is to provide a visual display device capable of being clearly and easily viewed by altering a constitution and arrangement of elements from the prior art and including a liquid crystal cell producing a display of an LCD, a visual information decorating the display and a light source in a conventional visual display unit.

A visual display device according to the present invention comprises a display means for displaying a display information driven from the outside on a surface therein through which a light beam is transmitted, a decorating means comprising a decorative image for providing a stationary decorative or auxiliary display on a surface behind the display means, a transparent illuminating means interposed between the display means and the decorating means and provided with the capability of surface light emission, and a reflecting surface positioned at the rearmost position. Generally, an LCD (liquid crystal cell) is utilized as the display means which is electrically driven by an outside drive force. As the transparent illuminating means, any means may be used as long as it is transparent and capable of surface illumination. In particular, a light transmitting plate may be used to carry out surface-guided light emission by transmitting a light beam from a light source at the side of the transmitting plate through the transmitting plate and refracting it along the surface thereof. The visual display unit may be provided with an exchanging means for taking out the decorating means therefrom to be exchanged for another. Further, the decorative image in the decorating means may also be formed by using dynamic image information produced by the LCD (liquid crystal cell) to alter the image content.

Still further, the exchanging means may be formed such that the decorating means is removable from the visual display unit together with the reflecting means.

In accordance with the above constitution, the visual display device of the present invention is able to provide decoration without losing the content of the display information or blocking light from the illuminating means even when the decoration is presented in a portion where the display information is superposed.

BRIEF DESCRIPTION OF THE DRAWINGS

FIG. 6A is an exploded perspective view illustrating a second embodiment of the present invention.

FIG. 6B is a cross sectional view illustrating the display section the second embodiment of the present invention.

FIG. 6C is a cross sectional view illustrating when a image information plate is exchanged in the second embodiment of the present invention.

DETAILED DESCRIPTION OF THE PREFERRED EMBODIMENTS

Figure 1:
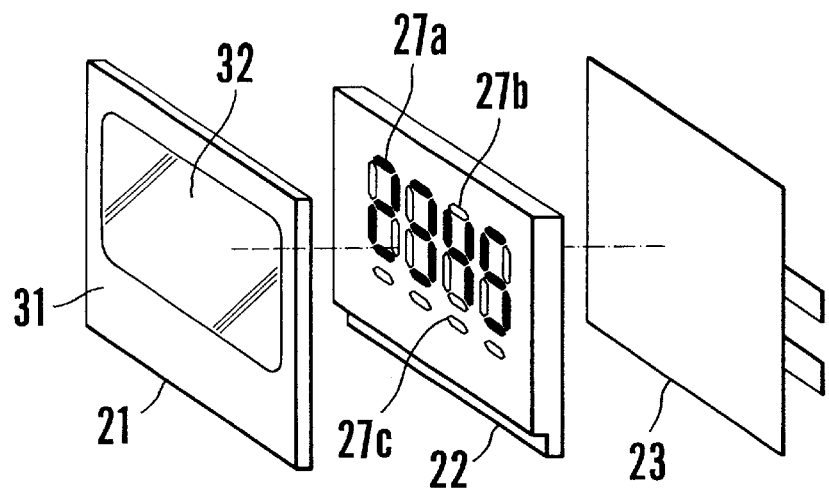
FIG. 1 is an exploded perspective view illustrating a constitution of an example of a conventional visual display unit.
Figure 2A:
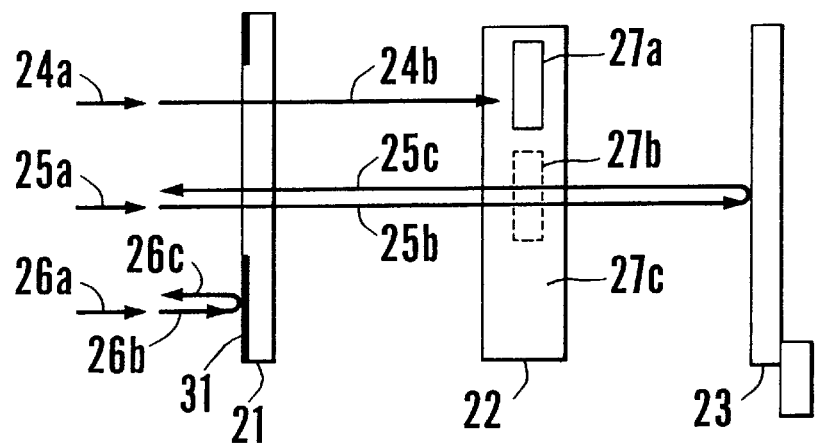
FIG. 2A is a view illustrating the path of a light beam in the case that the conventional visual display device in FIG. 1 is subjected to a light beam from the outside.
Figure 2B:
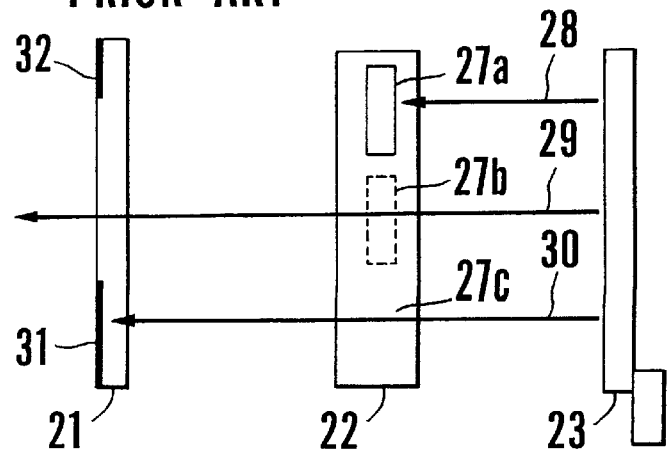
FIG. 2B is a view illustrating the path of a light beam in the case that the conventional visual display device in FIG. 1 is subjected to a light beam from the inside thereof.
Figure 3:
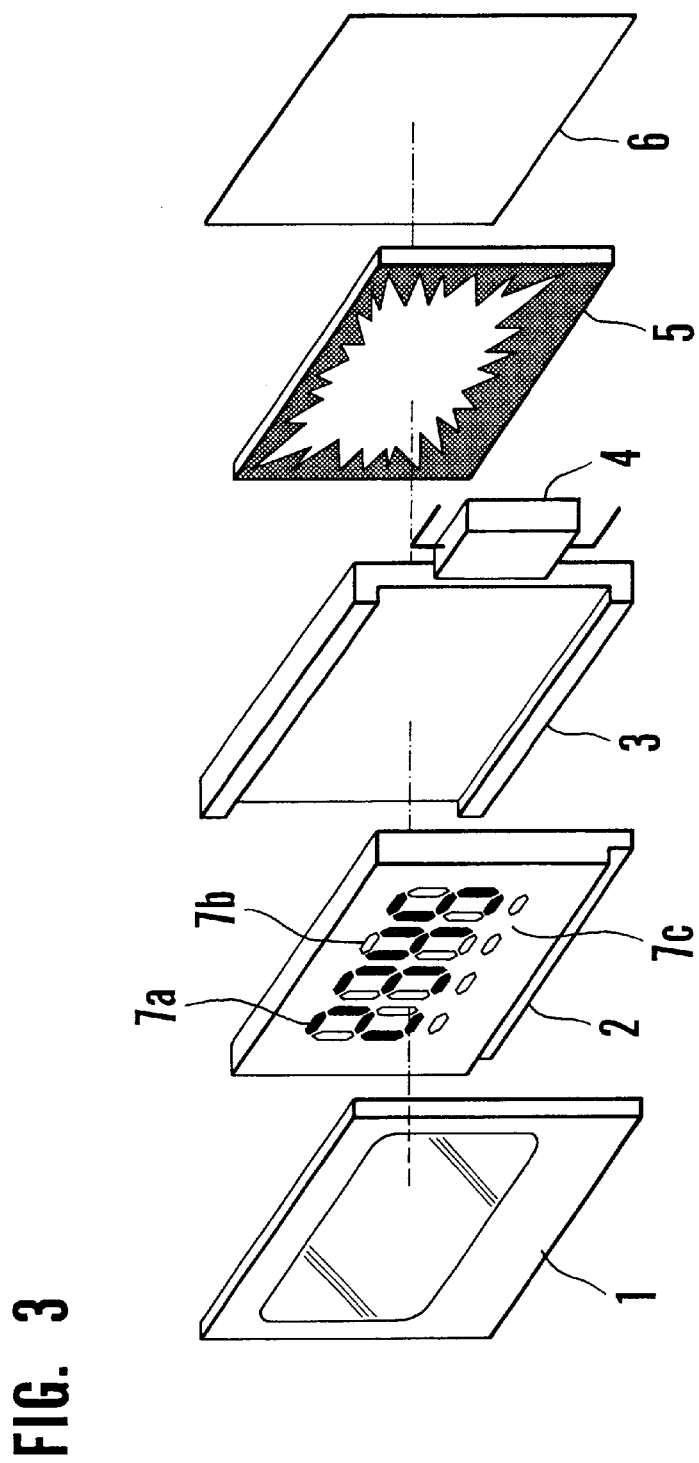
FIG. 3 is an exploded perspective view illustrating a constitution of the visual display device of a first embodiment according to the present invention.

Next, referring to the drawings, the present invention will be described. FIG. 3 is a perspective view illustrating a constitution of a first embodiment of the present invention.

For the purpose of making it possible to provide decoration without losing the content of the display information or blocking light from the illuminating means even when the decoration is provided on a portion on which the display information is superimposed, the visual display device of the first embodiment comprises an LCD 2 as a displaying means for allowing a light beam to be transmitted therethrough while displaying the display information, an image information plate 5 as the decorating means positioned behind the display information and for decorating the display information, a light beam source 4 as a light emitting means for illuminating the display information and the decorative image, a light beam guiding plate 3 as the light beam guiding means for guiding the path of a light beam and diffusing the light beam, a screen 1 as the masking plate, and a reflecting plate 6 as the reflecting means.

The constitution of the visual display device of the first embodiment, as viewed from the outside and front of the portable unit, is arranged in the order of the screen 1, the LCD 2, the light beam guiding plate 3, the image information plate 5 and the reflecting plate 6. The light beam guiding plate 3 is not a self-luminous element but rather is an element that guides and refracts a light beam from the light source 4 provided at the side of the plate 3.

According to this construction, since the image information plate 5 is positioned behind the display information when the display section is viewed from the outside and front of the portable unit, the image information will never overshadow or otherwise spoil the contents of the displayed information. Further, since there is no blockage between the illuminating element and the display information, the illumination is effected over the whole range of the display information portion.

Referring to the accompanying drawings, embodiments of the present invention are further explained in detail.

FIG. 3 is a perspective view showing the constitution of the visual display device depicted as the first embodiment of the present invention. The visual display device is constructed by arranging the following elements in tandem in the order listed from the outside of the portable unit: the screen 1 (the masking plate) which decorates the display contents to such an extent as not to overshadow or cover it; the LCD 2 (liquid crystal cell) which switches between the blocking of and transmission of a light beam by operating an inner liquid crystal element therein according to an electrical drive control thereof; the light guiding plate 3 made from a material through which a light beam is transmittable and which effects pseudo surface light emission by refracting the light beam guided from the side light source with the aid of its treatment in the surface; the light beam source 4 supplying a light beam from the side portion of the light guiding plate 3; the image information plate 5 decorating the information displayed by the LCD 2 and representing a supplemental information; and the reflecting plate 6 rendering a lightness information in the visual display unit distinct by reflecting a light beam passing through the image information plate 5.

Hereinafter, the operation of the embodiment having the above construction is explained.

Figure 4:
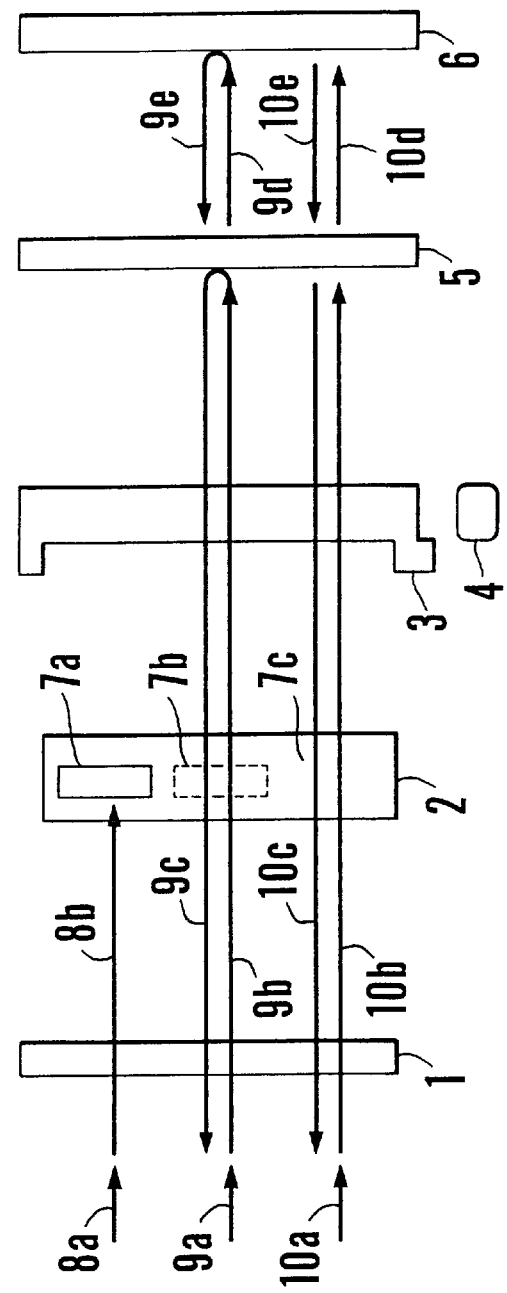
FIG. 4 is a view illustrating the path of a light beam in the case that the visual display device of the first embodiment is exposed to a light beam from the outside.

FIG. 4 is a view illustrating the path of a light beam in the case that the visual display device of the embodiment is exposed to light from the outside.

The reference numerals 7a, 7b and 7c in FIG. 4 each represents an inner state of the LCD 2. Specifically, the display section 7a designates a portion where the liquid crystal is in a state which blocks light upon being subjected to an electrical drive control, while the non-display section 7b designates a portion where the liquid crystal is in a state which transmits light by the electrical drive control. The background section 7c denotes a portion which is not affected by the electrical drive control and is therefore always in a state to transmit light. Likewise, the reference numerals 8a–8b, 9a–9e and 10a–10e in FIG. 4 shows the path followed by a light beam from the outside as it enters into the display section and how it is transmitted therethrough, reflected and absorbed therein. Specifically, each of the reference numerals 8a–8b, 9a–9e and 10a–10e respectively designates the path of a light beam being radiated into the display section 7a in the state of blocking light, another light beam being radiated into the non-display section 7b in the state of transmitting light, and still another light beam being radiated into the background section 7c not subjected to electrical control and always transmitting light.

The light beam 8a radiated toward the display section 7a which has been placed in the light blocking state by electrically controlling the LCD 2 reaches the LCD 2 through the screen 1 from the outside of the portable device. The light beam 8b arriving at the LCD 2 is blocked by the display section 7a and is absorbed and reflected. As a result, the portion of the display section 7a is perceived as a black portion or a dark portion when viewed from the outside.

Next, the light beam 9a radiated toward the non-display section 7b which has been placed in the light transmitting state by electrically controlling the LCD 2 reaches the image information plate 5 through the screen 1, the LCD 2 and the light guiding plate 3. Part of the spectrum components of the light beam 9b which has reached the image information plate 5 are absorbed into the image information plate 5, the other part thereof (9d) are subjected to transmission therethrough and reflection (9e). The light beam 9d of the components transmitted through the information plate 5 is blocked by the reflecting plate 6 and returned to the image information plate 5 as the reflected light beam 9e. The composite light beam, comprised of the light beam 9c reflected by the image information plate 5 and the components transmitted through the image information plate 5 as part of the light beam 9e, is radiated to the outside of the portable unit through the light beam guiding plate 3, the LCD 2 and the screen 1. Thus, the portion of the non-display section is perceived to take on the color of the image information plate 5.

The light beam 10a radiated into the background section 7c of the LCD which is always in the light transmittable state travels similarly to the light beam 9a radiated into the non-display section 7b, so that the portion of the background section 7c is similarly perceived to take on the color of the image information plate 5 when seen from the outside.

According to the above description, when the display section is viewed with an outside light beam, the darkness of the information display on the LCD 2 and the pattern of the image information plate 5 can thus be seen.

Below, a description is provided for when the display section is subjected to irradiation from an inside light beam.

Figure 5:
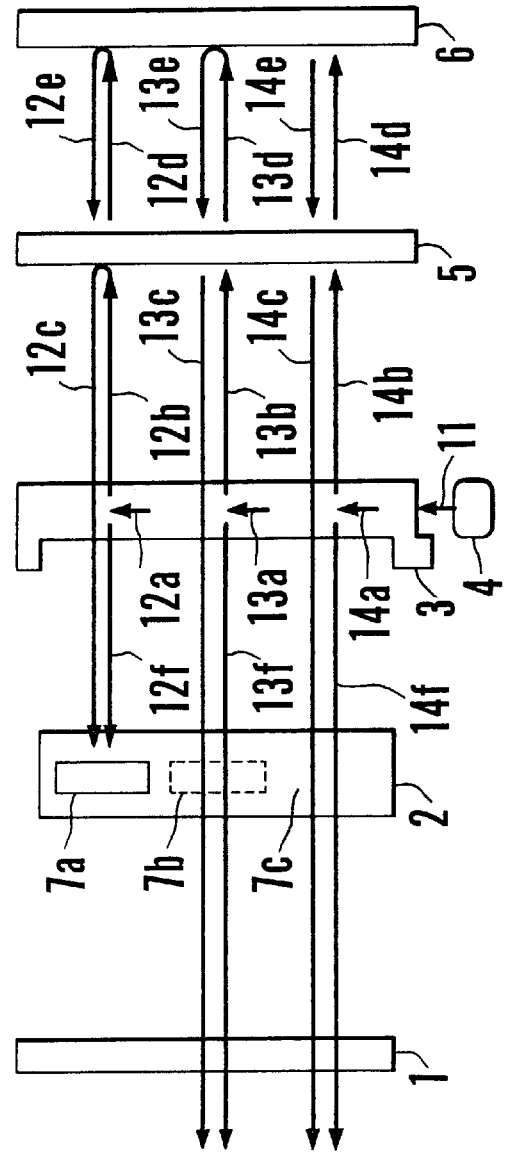
FIG. 5 is a view illustrating the path of a light beam in the case that the visual display device of the first embodiment is subjected to a light beam from the inside.

FIG. 5 is a view illustrating a path of a light beam in the case that the visual display device of the embodiment is exposed to an inside light beam.

In the same manner as in the case of FIG. 4, the reference numerals 11, 12a–12f, 13a–13f and 14a–14f in FIG. 5 each represents a path of an inside light beam entering into the display section and how it is transmitted therethrough, reflected and absorbed therein. Specifically, each of the reference numerals designates a respective path wherein reference 11 represents a light beam produced in the light source 4 and radiated into the light beam guiding plate 3. Reference numerals 12a–12f represent a light beam being refracted in the light beam guiding plate 3 to be radiated into the display section 7a which is in a light blocking state. Reference numerals 13a–13f represent a light beam being refracted in the light beam guiding plate 3 to be radiated into the non-display section 7b which is in a light transmittable state. Reference numerals 14a–14f likewise represent a light beam being refracted in the light beam guiding plate 3 to be radiated into the background section 7c which is not subjected to electrical control.

With respect to the light beam 12a which is radiated from the light beam source 4 and refracted in the light beam guiding plate 3 to be emitted toward the display section 7a placed in the light blocking state by the electrically controlled LCD 2, part of the light beam 12a is bent toward the image information plate 5 positioned toward the rear side of the unit due to refraction (12b), and another part thereof is bent toward the LCD 2 positioned toward the front side thereof (12f). With respect to the light beam 12b which has reached the image information plate 5, part of the spectrum components thereof are absorbed into the image information plate 5 and the other part thereof is transmitted therethrough. The light beam 12d of the components transmitted through the image information plate 5 is blocked by the reflecting plate 6 and returned to the image information plate 5 as the reflected light beam 12e. The composite light beam 12c formed of the components of the light beam 12b reflected by the image information plate 5 and the components of the light beam 12e transmitted through the image information plate 5 from behind passes through the light beam guiding plate 3, and further forms a composition with the light beam 12f bent toward the front in the light beam guiding plate 3 to reach the LCD 2. The light beam thus reaching the LCD 2 is blocked by the display section in the light blocking state, and is absorbed thereinto and reflected therefrom. According to the above, the portion of the display section 7a is therefore perceived as a black or dark portion.

As for the light beam 13a being radiated from the light beam source 4 and refracted in the light beam guiding plate 3 and further emitted toward the non-display section 7b which is a light beam transmittable state, part of the light beam is bent toward the image information plate 5 positioned toward the rear side of the unit due to refraction (13b), and another part thereof is bent toward the LCD 2 positioned toward the front side thereof (13f). With respect to the light beam 13b which has reached the image information plate 5, part of the spectrum components thereof are absorbed into the image information plate 5 and the other part thereof is transmitted therethrough. The light beam 13d of the components transmitted through the image information plate 5 is blocked by the reflecting plate 6 and returned to the image information plate 5 as the reflected light beam 13e. The composite light beam 13c formed of the components of the light beam 13b reflected by the image information plate 5 and the components of the light beam 13e transmitted through the image information plate 5 passes through the light beam guiding plate 3, and further forms a composition with the light beam 13f bent toward the front in the light beam guiding plate 3, and still further is emitted toward the outside of the portable unit through the LCD 2 and the screen 1. Thus, the portion of the non-display section 7b is perceived as the color of the image information plate 5 when viewed from the outside.

The beam light 14a is radiated from the light beam source 4, refracted in the light beam guiding plate 3 and radiated into the background section 7c of the LCD 2 which is always in a light transmittable state, and also travels similarly to the light beam 13a radiated into the non-display section 7b (14b–14f), so that the portion of the background section 7c is similarly perceived as to take on the color of the image information plate 5 when seen from the outside.

According to the above, when the display section is viewed with an interior light, the darkness of the information display on the LCD 2 and the pattern of the image information plate 5 can thus be seen.

Next, a second embodiment of the present invention will be described.

FIG. 6A, FIG. 6B and FIG. 6C are an exploded perspective view and cross sectional views for illustrating the second embodiment. There is formed between rectangular bodies 15 and 16 of the portable unit a slit having such a size that the image information plate 5 and the reflecting plate 6 can be drawn out therefrom, and through which the reflecting plate 6 is inserted into a guiding plate 19. The reflecting plate 6 is provided with a fixing film 17 for holding the image information plate 5 and a knob 18 for pulling out the reflecting plate 6. According to this construction, even when the unit is in an assembled state, it is possible for the image information plate 5, as illustrated in FIG. 6C, to be taken out together with the reflecting plate 6 by pulling on the knob 18. Hence, the image information plate 5 can be readily exchanged for another one by lifting up the fixing film 17. Each of the screen 1, the LCD 2, the light beam guiding plate 3 and the light beam source 4 in this embodiment is the same as the respective and corresponding part of the first embodiment; consequently, explanation of these elements will be omitted.

Next, a third embodiment of the present invention will be explained.

Figure 7:
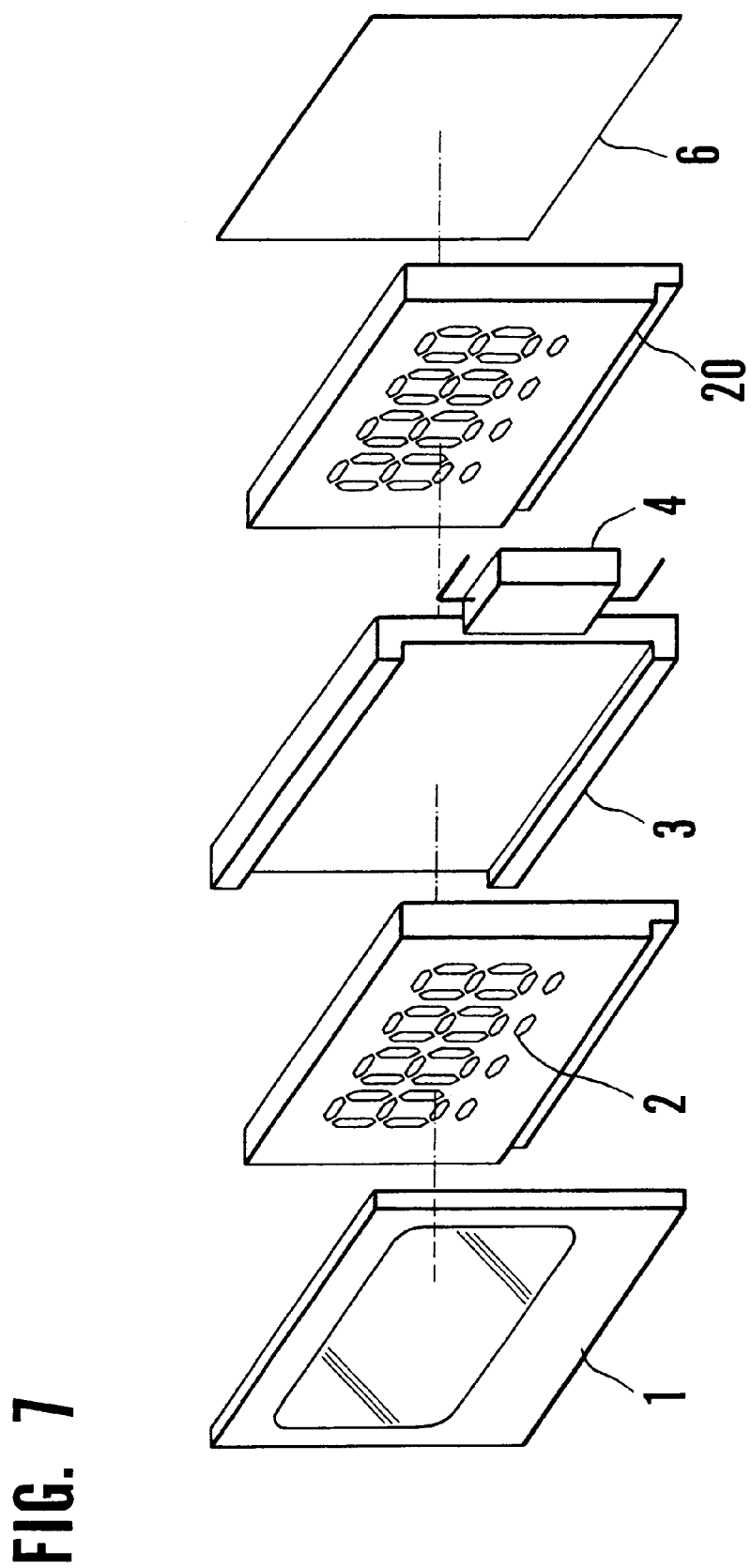
FIG. 7 is a perspective view illustrating the third embodiment of the present invention.

FIG. 7 is a perspective view illustrating the third embodiment. Another LCD 20 different from the LCD 2 is used as the image information plate 5. The LCD 20 is capable of producing a dynamic image. Consequently, the composition of the information contents produced individually by each of the LCD 2 and the LCD 20 appears as information from the respective display sections. The LCD 20 serving as an image information plate presents an appropriate decoration every time the information content produced by the LCD 2 are varied. Each of the screen 1, the LCD 2, the light beam guiding plate 3 and the light beam source 4 in this embodiment is the same as the respective and corresponding part of the first embodiment; consequently, explanation of these elements will be omitted.

If colors not used in the LCD 2 are used in the LCD 20 even when the LCD 2 is, for example, a monochromatic LCD, it becomes possible to make a two-colored or multi-colored presentation by forming a composite image with the LCD 2 and the LCD 20.

Further, there can appear to be a subtle shift between the images of the LCD 2 and the LCD 20 due to the thickness of the LCD 2 and the position from which the apparatus is viewed. Accordingly, the image component of the LCD 20 in the composite image of both the LCD 2 and the LCD 20 is perceived as if it is more deeply positioned, so as to effect a perception of depth of the image.

A first advantage of the present invention according to the above embodiments is that the display contents are not lost and can be decorated without blocking any of the illumination light.

This advantage is achieved by positioning the decoration behind the display information. The illumination for the display section is effected by use of a light emission from the side of a means interposed between the display information and the decorating image, and thereby both of the display information and the decorating image can be illuminated without diminishing the illuminating light.

A second advantage is that a user of this device may exchange the decorative image freely to select the most suitable decoration.

The reason for this is that whether a light for illuminating the decorating image is a reflection therefrom or a transmission therethrough, the material of the decorative image need not be limited, thus rendering the decorative image exchangeable without losing the first advantage as long as an easily exchangeable means thereof is additionally provided.

A third advantage is that utilization of the two LCDs enables decoration with an image of a variety of contents. Additionally, even when the two LCDs are each monochromatic, a two-colored or multicolored display becomes realizable by using different monochromatic colors in each LCD. Further, a display having depth of field can be presented by utilizing a positional shift corresponding to a thickness of the two LCDs.

The reason for this is that regardless of whether the rearmost positioned LCD is of a transmitting type of reflecting type, the illuminating light is less diminished even when there is a relatively large area of blocking or darkness on the display portion of the LCD.

What is claimed:

1. A visual display device comprising:
    a displaying means for transmitting a light beam therethrough while displaying a display information;
    a decorating means positioned behind the displaying means and having a decorating image for decorating the display information;
    a light beam guiding means positioned between said displaying means and said decorating means for guiding a light beam;
    a light emitting means disposed at the side of said light beam guiding means for emitting a light beam to be guided by said light beam guiding means toward the displaying means and the decorating means to effect illumination thereof;
    a reflecting means positioned behind the decorating means; and
    an exchanging means for removing said decorating means from said visual display device so that said decorating means can be separated from said reflecting means to facilitate an exchange of said decorating means.

2. A visual display device according to claim 1, wherein said displaying means is an LCD (liquid crystal cell).

3. A visual display device according to claim 1, wherein said light beam guiding means is a light beam guiding plate capable of refracting a light beam along a surface thereof and transmitting the light beam from the light beam source at the side of the light beam guiding means.

4. A visual display device according to claim 1, wherein said exchanging means is adapted to remove said decorating means together with said reflecting means from said visual display device, whereupon said decorating means is separable from said reflecting means.

5. A visual display device comprising:
    a displaying means for transmitting a light beam therethrough while displaying a display information;
    a decorating means positioned behind the displaying means and having a decorating image for decorating the display information, wherein the decorating image provided by said decorating means is a dynamic image provided by an LCD capable of varying an image content displayed thereon;

a light beam guiding means positioned between said displaying means and said decorating means for guiding a light beam;

a light emitting means disposed at the side of said light beam guiding means for emitting a light beam to be guided by said light beam guiding means toward the displaying means and the decorating means to effect illumination thereof; and a reflecting means positioned behind the decorating means.

6. A visual display device according to claim 5, wherein said display means is an LCD (liquid crystal cell).

7. A visual display device according to claim 5, wherein said light beam guiding means is a light beam guiding plate capable of refracting a light beam along a surface thereof and transmitting the light beam from the light beam source at the side of the light beam guiding means.

8. A visual display device comprising:

a protective screen;

a liquid cell for effecting blockage and transmission of light therethrough;

a light beam guiding plate having a light beam transmittable property for effecting emission of light from a surface thereof;

a light beam source for supplying a light beam into a side of said light beam guiding plate;

an image information plate for displaying a stationary auxiliary information; and a reflecting plate serving as a background, wherein said screen, said liquid cell, said light beam guiding plate, said image information plate and said reflecting plate are arranged in the order listed, wherein said image information plate is structured so as to be removable from said visual display device and separable from said reflecting plate, to thereby be exchangeable.

9. A visual display device according to claim 8, wherein said reflecting plate is removable from said visual display device along with said image information plate, and is adapted to separably attach said image information plate thereto.

10. A visual display device according to claim 9, wherein said reflecting plate includes a main body and an attaching element which is adapted to attach said image information plate by sandwiching said image information plate between said main body and said attaching element.

11. A visual display device comprising:

a protective screen;

a liquid cell for effecting blockage and transmission of light therethrough;

a light beam guiding plate having a light beam transmittable property for effecting emission of light from a surface thereof;

a light beam source for supplying a light beam into a side of said light beam guiding plate;

an image information plate for displaying auxiliary information, wherein said image information plate is a liquid crystal cell capable of varying a dynamic image displayed thereon; and a reflecting plate serving as a background, wherein said screen, said liquid cell, said light beam guiding plate, said image information plate and said reflecting plate are arranged in the order listed.

12. A visual display device comprising:

a protective screen;

a first liquid cell for effecting blockage and transmission of a light beam therethrough;

a light beam guiding plate having a light beam transmittable property for effecting emission of light from a surface thereof;

a second liquid cell for effecting blockage and transmission of a light beam therethrough; and a reflecting plate serving as a background, said visual display device further comprising a light beam source for supplying a light beam into a side of the light beam guiding plate.

* * * * *